(12) United States Patent
Sunwoo et al.

(10) Patent No.: US 12,146,067 B2
(45) Date of Patent: Nov. 19, 2024

(54) COATING RESIN COMPOSITION FOR FLEXIBLE COVER WINDOW AND FLEXIBLE COVER WINDOW USING SAME

(71) Applicant: UTI INC., Chungcheongnam-do (KR)

(72) Inventors: Kukhyun Sunwoo, Gyeonggi-do (KR); Hak Chul Kim, Chungcheongnam-do (KR); Tea Joo Ha, Chungcheongnam-do (KR); Jae Suk Oh, Gyeonggi-do (KR); Jung Cheol Noh, Jeollabuk-do (KR)

(73) Assignee: UTI INC., Chungcheongnam-do (KR)

( * ) Notice: Subject to any disclaimer, the term of this patent is extended or adjusted under 35 U.S.C. 154(b) by 404 days.

(21) Appl. No.: 17/554,432

(22) Filed: Dec. 17, 2021

(65) Prior Publication Data

US 2022/0195235 A1 Jun. 23, 2022

(30) Foreign Application Priority Data

Dec. 21, 2020 (KR) .......................... 10-2020-0179703

(51) Int. Cl.
*C09D 151/08* (2006.01)
(52) U.S. Cl.
CPC .................................. *C09D 151/08* (2013.01)
(58) Field of Classification Search
CPC ........ B32B 17/10018; B32B 17/10146; B24B 7/24; G06F 1/1652
See application file for complete search history.

(56) References Cited

U.S. PATENT DOCUMENTS

2018/0364759 A1* 12/2018 Ahn ......................... B32B 7/12

FOREIGN PATENT DOCUMENTS

JP 2012-166194 A 9/2012
WO 2019004125 A1 1/2019

OTHER PUBLICATIONS

Shin-Etsu, Silicones for Paints and Coatings, 2016, Shin-Etsu Silicone, pp. 1-32 (Year: 2016).*
Hatakeyama et al, WO2019/004125A1—English Translation, 2019, JPO, pp. 1-71 (Year: 2019).*

* cited by examiner

*Primary Examiner* — Maria V Ewald
*Assistant Examiner* — Ethan Weydemeyer
(74) *Attorney, Agent, or Firm* — Mendelsohn Dunleavy, P.C.

(57) ABSTRACT

Proposed are a coating resin composition for a flexible cover window and a flexible cover window formed using the same composition. The coating resin composition, includes, relative to the total weight thereof, 10 to 150 parts by weight of a urethane (meth)acrylate-based oligomer prepared by synthesizing an acrylic monomer containing a hydroxyl group with a urethane prepolymer synthesized from an ether-based polyol, diisocyanate, and polyoxyalkylene-based bisphenol ether, 1 to 60 parts by weight of a first photocurable acrylate-based monomer, 0.5 to 10 parts by weight of a second photocurable acrylate-based monomer, 0.5 to 10 parts by weight of an alkoxy silane coupling agent, 0.1 to 5 parts by weight of a siloxane additive, and to 20 parts by weight of a photopolymerization initiator.

12 Claims, 3 Drawing Sheets

COATING RESIN COMPOSITION FOR FLEXIBLE COVER WINDOW AND FLEXIBLE COVER WINDOW USING SAME

CROSS REFERENCE TO RELATED APPLICATION

The present application claims priority to Korean Patent Application No. 10-2020-0179703, filed Dec. 21, 2020, the entire contents of which is incorporated herein for all purposes by this reference.

BACKGROUND OF THE INVENTION

1. Field of the Disclosure

The present disclosure relates to a coating resin composition for a flexible cover window and a flexible cover window using the same. More specifically, the present disclosure relates to a coating resin composition for a flexible cover window that improves the strength and folding characteristics of a flexible cover window by being coated on one or both sides of the flexible cover window and to a flexible cover window using the same.

2. Description of the Related Art

Recently, electric and electronic technologies have developed rapidly, and various types of display products have been released to meet the needs of new times and consumers. Accordingly, research on flexible displays that can fold and unfold screens is active.

In the case of a flexible display, research is basically being conducted in the form bending, rolling, and stretching starting from folding. A cover window for protecting the display panel as well as the display panel should be formed to be flexible.

Such a flexible cover window should have good flexibility, should not cause marks on the folding part even after being folded many times, and should not cause distortion of image quality.

For the cover window of the existing flexible display, a polymer film made of PI or PET has been applied on the surface of the display panel.

However, such a polymer film simply serves to prevent scratches on a display panel and is vulnerable to impact due to weak mechanical strength. Furthermore, the polymer film has low transmittance and is relatively expensive.

In addition, when the number of folding operations of the display increases, marks are left on the folding part, resulting in damage to the folded part. For example, pressing or tearing the polymer film occurs during the evaluation of the folding operation limit (normally 200,000 times).

Recently, in order to overcome the limitations of the cover window of the polymer film, various studies on glass-based cover windows have been made.

Such a glass-based cover window is required to have physical properties that satisfy folding characteristics, to cause no distortion of the screen, and to have sufficient strength even in the case of repeated contacts and pressings by touch pens or the like.

In order to satisfy the strength required for the cover window, the glass should be a certain thickness or more. In addition, to satisfy the folding characteristics, the glass should be less than a certain thickness. In addition, there is a need for research on the optimal cover window thickness and structure not causing distortion of the screen.

According to the related art, there are many technologies in which a glass is formed to satisfy the folding and strength characteristics, and a folding area (folding part) of a cover window is formed to be relatively thinner than other areas (for example, a plane part 111).

In order to improve the folding and strength characteristics in such a glass-based cover window, a transparent resin layer may be formed on one or both surfaces of the glass-based cover window.

Conventional transparent resin layers are disadvantageous in that the adhesiveness to a glass substrate is poor. In addition, there are problems of deterioration of visibility due to bending of the folding part and of material damage such as tearing or denting during the evaluation of the folding limit (usually 200,000 times).

In addition, in the case of a conventional transparent resin layer, since the coating on the glass is not uniform, visibility is degraded, and precision coating is difficult, making it difficult to provide high-quality products.

SUMMARY OF THE DISCLOSURE

The present disclosure has been derived from the above necessity, and one objective of the present disclosure is to provide a coating resin composition for a flexible cover window, the coating resin composition being capable of improving the strength and folding characteristics of the flexible cover window by being coated on one or both sides of the flexible cover window. Another objective of the present disclosure is to provide a flexible cover window prepared using the same.

The present disclosure provides a coating resin composition for a flexible cover window, the composition including: 10 to 150 parts by weight of a urethane (meth)acrylate-based oligomer prepared by synthesizing an acrylic monomer containing a hydroxyl group with a urethane prepolymer synthesized from an ether-based polyol, diisocyanate, and polyoxyalkylene-based bisphenol ether; 1 to 60 parts by weight of the first photocurable acrylate-based monomer; 0.5 to 10 parts by weight of a second photocurable acrylate-based monomer; 0.5 to 10 parts by weight of an alkoxysilane coupling agent; 0.1 to 5 parts by weight of a siloxane additive; and 1 to 20 parts by weight of a photopolymerization initiator.

The urethane (meth) acrylate-based oligomer may be prepared by synthesizing 1 to 30 parts by weight of the acrylic monomer containing a hydroxyl group with a urethane prepolymer synthesized from 20 to 100 parts by weight of an ether-based polyol, 1 to 25 parts by weight of diisocyanate, and 1 to 50 parts by weight of a polyoxyalkylene-based bisphenol ether.

The polyoxyalkylene-based bisphenol ether may be one or a mixture of two or more selected from the group consisting of polyoxyethylene bisphenol F ether, polyoxyethylene bisphenol A ether, and polyoxypropylene bisphenol A ether.

The urethane (meth) acrylate-based oligomer may be prepared by synthesizing an acrylic monomer (M) containing a hydroxyl group with a urethane prepolymer synthesized from ether-based polyol (R2), diisocyanate (I), and polyoxyalkylene-based bisphenol ether (R1). The urethane (meth) acrylate-based oligomer may have a general structure of M-I-R2-I-R2-R1-I-R2-I-R2-I-M (wherein R1, R2, I, and M refer to a moiety derived from a corresponding compound).

The first photocurable acrylate-based monomer is one or a mixture of two or more selected from the group consisting of 2-hydroxyethyl acrylate (2-HEA), hydroxyethyl methacrylate (HEMA), hexanediol diacrylate (HDDA), hydroxypivalic acid neopentyl glycol diacrylate (HPNDA), and tripropylene glycol diacrylate (TPGDA).

The second photocurable acrylate-based monomer may be one or a mixture of two or more selected from the group consisting of 1,6-hexanediol diacrylate (HDDMA), hydroxypivalic acid neopentyl glycol diacrylate (HPNDA), trimethylolpropane triacrylate (TMPTA), pentaerythritol triacrylate, trimethylenepropane triacrylate, pentaerythrityl triacrylate, trimethylene propyl triacrylate, and propoxylated glycerol triacrylate.

The alkoxy silane coupling agent may be one or a mixture of two or more selected from the group consisting of vinyltrimethoxysilane, vinyltriethoxysilane, phenyltrimethoxysilane, octadecyltrimethoxysilane, 2-(3,4-epoxycyclohexyl)ethyltrimethoxysilane, 3-glycidyloxypropyltrimethoxysilane, 3-glycidyloxypropyltriethoxysi lane, 3-glycidyloxypropylmethyldiethoxysilane, 3-methacryloxypropylmethyldimethoxysilane, 3-methacryloxypropylmethyldiethoxysilane, 3-methacryloxypropyltriethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-mercaptopropyltrimethoxysilane, and 3-mercaptopropyltriethoxysilane.

The siloxane additive may be one or a mixture of two or more selected from the group consisting of polydimethylsiloxane, polyether-modified polydimethylsiloxane, and polyketylalkylsiloxane having 2 to 10 carbon atoms.

The present disclosure provides a flexible cover window provided with a resin layer made of the coating resin composition on one or both surfaces thereof, the flexible cover window including: a plane part formed to correspond to a flat area of a flexible display; and a folding part formed to correspond to a folding area of the flexible display, connected to the plane part, and configured to be relatively thin compared to the plane part.

The resin layer may fill the folding part, may be formed, as a single layer or as a laminate of multiple layers, on one or both surfaces (or the entire surface) of the flexible cover window.

When the resin layer is formed on both surfaces of the flexible cover window, the resin layer positioned on the front side of the flexible cover window may be made of a relatively harder material than the resin layer positioned on the rear surface of the flexible cover window.

When the resin layer is formed as a laminate of multiple layers on the front surface of the flexible cover window, the resin layer may be formed such that the hardness thereof gradually increases from the bottom to the top thereof.

The resin layer may have a thickness of 0.01 to 0.6 mm.

The present disclosure provides a flexible cover window that is based on glass and is coated with a resin layer on one or both surfaces thereof, so that the flexible cover window exhibits improved strength and folding characteristics. In particular, when the resin layer is made of a photocurable resin, the strength and folding characteristics of the flexible cover window are further improved because the flexibility and visibility in a folding part are improved.

In addition, the resin layer, according to the present disclosure, may have increased adhesiveness to a glass substrate, exhibit excellent mechanical strength by enabling uniform coating, and provide excellent optical properties due to a similar refractive index to a glass-based cover window made.

In addition, the flexible cover window shows a satisfiable limit folding level (folding threshold point) at which the resin layer or glass is damaged. The limit folding level may be 0.5r. Therefore, the flexible cover window according to the present disclosure has excellent folding characteristics.

In addition, with the use of the resin layer according to the present disclosure, it is possible to provide a high-quality flexible cover window having improved durability through excellent restoring and elastic properties and uniform coating.

DESCRIPTION OF THE PREFERRED EMBODIMENTS

The present disclosure relates to a resin composition for a flexible cover window and to a flexible cover window using the same. The objective of the present disclosure is to provide a flexible cover window the strength and folding characteristics of which are improved due to the presence of a resin layer formed on one or more surfaces of a base plate thereof.

In particular, the resin composition to form the resin layer is a photocurable resin, thereby improving the bending phenomenon and visibility in the folding part to secure the strength and folding characteristics further.

In addition, excellent mechanical strength may be secured by improving the adhesion to the glass substrate and providing uniformity of the coating. The refractive index of the resin composition is similar to the refractive index of the glass substrate to provide excellent optical properties and excellent restoration and elasticity limit durability is secured, and a high-quality flexible cover window may be provided through the uniformity of the coating surface.

Hereinbelow, the present disclosure will be described in detail with reference to the accompanying drawings.

Figure 3:
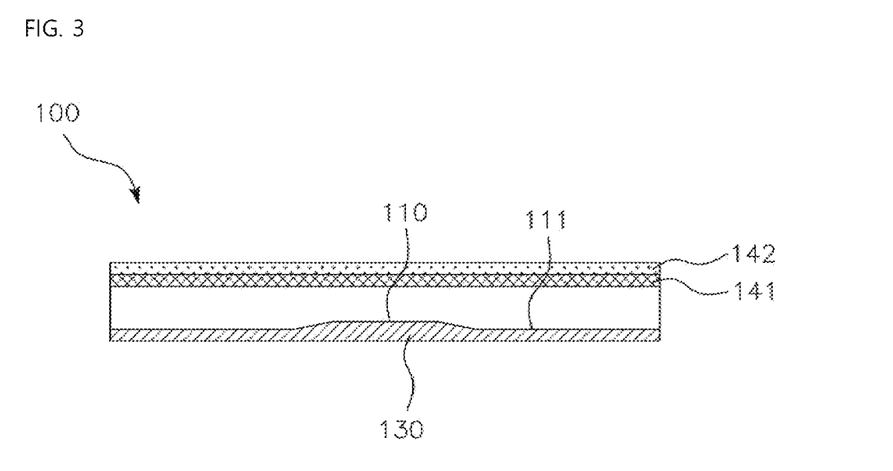
Figure 4:
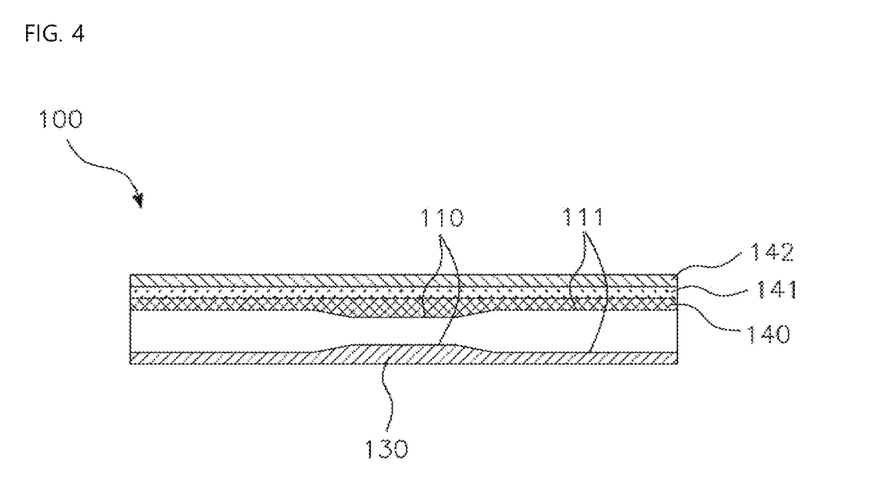
Figure 5:
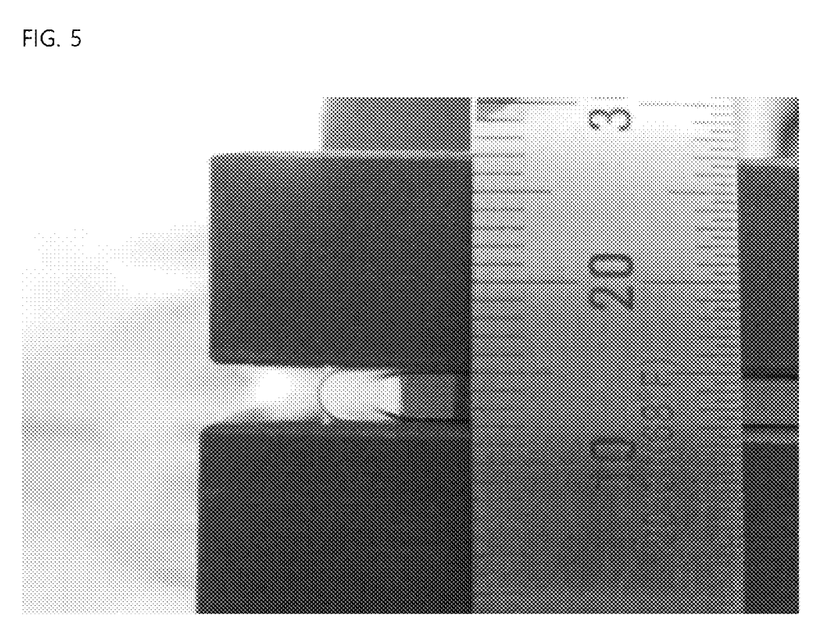
FIG. 5 is a photograph showing a process of measuring the folding characteristics of the flexible cover window according to the present disclosure.

FIGS. 1 to 4 are views showing various embodiments of a flexible cover window according to the present disclosure, and FIG. 5 is a view showing a photograph of measuring the folding characteristics of the flexible cover window according to the present disclosure.

As shown, the flexible cover window 100 according to an embodiment of the present disclosure includes: a plane part 111 formed to correspond to the flat area of the flexible display; and a folding part formed to be connected to the plane part 111, corresponds to a folding area of the flexible display, and is thinner than the plane part 111. However, although the folding part 110 is not formed, the thickness is very thin and may be applied to a foldable flat cover window.

Here, the area in which the display is folded refers to an area in which the display is folded or bent in half, and the area in which the cover window 100 is folded corresponding to this area is defined as the "folding part 110" of the cover window 100 in the present disclosure, and an area excluding the folding part 110 is called a "plane part 111" of the cover window 100.

The folding of the display in the present disclosure includes both in-folding and out-folding and is applied to a flexible display that may be operated in-folding or both in-folding and out-folding.

In the present disclosure, the thickness of the plane part 111 in the cover window 100 is 30 to 600 µm, and the thickness of the folding part 110 may be about 5 to 100 µm. The thickness of the flat cover window 100 without the folding part 110 may be about 1 to 600 µm.

Here, the folding part 110 may be formed to have a uniform thickness or to gradually increase thickness from the center of the folding area toward the outside. That is, the cross-sectional shape of the folding part 110 may be formed in a straight-line or curved shape.

When the cross-sectional shape of the folding part 110 is formed in a straight-line shape, folding characteristics are further improved compared to the technology formed in a curved shape. When the folding part 110 has a curved shape, a minimum thickness range is relatively small, and thus folding characteristics are degraded, such as breaking a thick part of a cover window during folding. However, when the folding part 110 has a uniform thickness as a whole, when the thickness is formed in a straight-line shape, an area with a minimum thickness is widely formed to improve flexibility, restoring force, elastic force, and the like, thereby improving folding characteristics.

In addition, the cover window in which the folding part 110 is formed in a curved shape is not easy to align the center part during assembly mechanically. The folding part 110, according to the present disclosure, has a uniform thickness and thus may reduce assembly tolerance when mechanically assembled, i.e., bonded to the front surface of the display panel, thereby minimizing a quality difference between products and reducing a defect rate.

As described above, the advantages of the folding part 110 with a straight-line shape are more than that of the folding part 110 with a curved shape, but according to the specifications of the product, the folding part 110 with a straight-line shape and the folding part 110 with curved shape may be selected and manufactured.

Here, the width of the folding part 110 is designed in consideration of the radius of curvature when the cover window 100 is folded and is approximately set to the radius of curvature×d. The thickness of the cover window 100 at the folding part 110 has a thickness of 5 to 100 µm, which is related to the folding part 110.

If the depth of the folding part 110 is too deep, that is, if the folding area of the cover window 100 is too thin, folding characteristics are good, but wrinkles or strength are disadvantageous during reinforcement. When the folding area of the cover window is formed too thickly, flexibility, the restoring force, and the elastic force in the folding area is reduced, so that the folding characteristic is reduced. The thickness of the cover window 100 in the folding part 110 is preferably 5 to 100 µm.

The cover window 100 in the present disclosure is formed with a thickness of about 30 to 600 µm based on glass and is chemically strengthened and used. In this thickness, the width and depth of the folding part 110 are appropriately designed as described above. If the thickness of the cover window is thinner than the thickness as described above, the thickness of the folding area of the cover window 100 becomes too thin after the formation of the folding part 110. Even if the thickness of the cover window is thicker than the thickness above, flexibility, resilience, and elasticity are reduced based on the glass as described above, and the weight reduction of the display product is hindered.

In an embodiment of the present disclosure, the folding part 110 is formed in the form of an inwardly slimming shape in the folding area of the cover window 100 and is formed in a rectangular trench shape as a whole. An inclined part 120 whose thickness gradually increases in the folding part 110 may be formed at both ends of the folding part 110 so as to be connected to a plane part of the cover window 100.

In particular, by forming inclined parts 120 having a low inclination at both ends of the folding part 110 (boundary with the plane part 111), the size of the reflection angle by the reflection surface in the entire region of the folding part 110 is similarly adjusted to minimize interference of light and visual visibility on the reflection surface.

As described above, the resin layer 130 may be formed on one or both surfaces of the flexible cover window 100, including the glass-based folding part 110 and the plane part 111, that is, any one of a front surface, a rear surface, a front surface/rear surface, and the total surface (including the sides) of the flexible cover window 100.

The resin layer 130 basically serves to improve the visibility of the boundary in the folding part 110, removes the air layer between the display panel and the glass substrate in the folding part 110, and improves the adhesion between the glass substrate and the display panel.

In the case of the existing resin layer, the adhesive force to the glass substrate is not high, and there is a problem of deteriorating visibility due to the bending of the folding part 110 during folding and damage to the material such as tearing or pressing during the evaluation of folding limit (typically 200,000 times).

In addition, in the case of a conventional transparent resin layer, since the coating on the glass is not uniform, visibility is degraded, and precision coating is difficult, making it difficult to provide high-quality products.

The present disclosure provides a coating resin composition for such a glass-based flexible cover window 100, provides a photocurable resin composition to improve flexibility and visibility in the folding part 110 to secure strength and folding characteristics.

In addition, the present disclosure provides a high-quality flexible cover window 100 through the uniformity of the coating surface with the resin composition, which improves the adhesion to the glass substrate, provides uniformity of the coating to ensure excellent mechanical strength, and has a similar refractive index to the cover window 100 made of glass to provide excellent optical properties, and secures the limit durability through the excellent restoring force and elasticity.

The coating resin composition for a flexible cover window according to the present disclosure includes: 10 to 150 parts by weight of a urethane (meth)acrylate-based oligomer prepared by synthesizing an acrylic monomer including a hydroxyl group with a urethane prepolymer synthesized from an ether-based polyol, diisocyanate, and polyoxyalkylene-based bisphenol ether; 1 to 60 parts by weight of a first photocurable acrylate-based monomer; 0.5 to 10 parts by weight of a second photocurable acrylate-based monomer; 0.5 to 10 parts by weight of an alkoxy silane coupling agent; 0.1 to 5 parts by weight of a siloxane additive; and 1 to 20 parts by weight of a photopolymerization initiator.

By using the resin composition according to the present disclosure, it is possible to provide a flexible cover window in which the adhesion to the glass-based substrate is excellent, the coating is uniformly performed to improve flexibility and visibility, and high-quality strength characteristics and folding characteristics are secured by securing durability through excellent restoring force and elastic force.

Specifically, the urethane (meth)acrylate-based oligomer may be prepared by synthesizing 1 to 30 parts by weight of an acrylic monomer containing a hydroxyl group in a urethane prepolymer synthesized from 20 to 100 parts by weight of an ether-based polyol, 1 to 25 parts by weight of diisocyanate, and 1 to 50 parts by weight of polyoxyalkylene-based bisphenol ether.

The ether-based polyol may be at least one selected from the group consisting of polytetramethylene glycol (PTMG), polypropylene glycol (PPG), and polyethylene glycol (PEG).

When the content of the ether-based polyol is less than 20 parts by weight, the mechanical strength may be reduced, and if it exceeds 100 parts by weight, the viscosity may increase, and workability may be reduced, which is not preferable.

The diisocyanate may be one or a mixture of two or more selected from the group consisting of 2,4-toluene diisocyanate, 2,6-toluene diisocyanate, isophorone diisocyanate (IPDI), hexamethylene diisocyanate, m-phenylene diisocyanate, and p-phenylene diisocyanate.

When the content of such diisocyanate is less than 1 part by weight, the strength may increase, but the viscosity may increase, and if it exceeds 25 parts by weight, the strength may decrease, and the viscosity may also decrease, which is not preferable.

In the present disclosure, a urethane (meth)acrylate-based oligomer may be obtained using polyoxyalkylene-based bisphenol ethers as well as ether-based polyols and diisocyanates. Such an oligomer contains a phenyl group and an epoxy group of bisphenol, has flexibilities and tensile properties, and may exhibit excellent mechanical strength when folded.

The polyoxyalkylene-based bisphenol ether may be one or a mixture of two or more selected from the group consisting of polyoxyethylene bisphenol F ether, polyoxyethylene bisphenol A ether, and polyoxypropylene bisphenol A ether.

When the content of the polyoxyalkylene-based bisphenol ether is less than 1 part by weight, the effect intended by this disclosure may not be exhibited, and when the content exceeds 50 parts by weight, the content of the ether-based polyol is relatively low, and mechanical strength may be degraded, which is not preferable.

That is, when the content ranges of the defined diisocyanate, polyoxyalkylene-based bisphenol ether, ether-based polyol, and acrylic monomer are lower, photocuring does not sufficiently occur, and when the content ranges exceed the range, the viscosity of the resin layer increases, hence degrading drying properties and coating uniformity.

The acrylic monomer containing the hydroxyl group may be one or a mixture of two or more selected from the group consisting of hydroxypropyl acrylate (HPA), 2-hydroxyethyl methacrylate (2-HEMA), 2-hydroxyethyl acrylate (2-HEA), and hydroxypropyl methacrylate (HPMA).

Here, when the content of the acrylic monomer containing a hydroxyl group is less than 1 part by weight, flexibility may decrease. When the content of the acrylic monomer containing a hydroxyl group exceeds 30 parts by weight, the viscosity is too high, which is not preferable because processability deteriorates.

In the present disclosure, the urethane (meth)acrylate-based oligomer is prepared by synthesizing an acryl-based monomer containing a hydroxyl group with a urethane prepolymer synthesized from ether-based polyol (R2), diisocyanate (I), and polyoxyalkylene-based bisphenol ether (R1). An acrylic monomer (M) containing a hydroxyl group may have a general structure of M-I-R2-I-R2-R1-I-R2-I-R2-I-M (wherein R1, R2, I, and M refer to a moiety derived from a corresponding compound).

Here, the 'general structure' does not mean the exact chemical structural formula of the urethane (meth)acrylate-based oligomer but means an arrangement of moieties derived from each of diisocyanate (I), polyoxyalkylene-based bisphenol ether (R1), ether-based polyol (R2), and the acrylic monomers (M) containing a hydroxyl group. These moieties may be formed by repeating an arrangement in the order of M-I-R2-I-R2-R1-I-R2-I-R2-I-M, thereby exhibiting the unique effect intended by the present disclosure.

The viscosity of the urethane (meth) acrylate-based oligomer may be 10,000 to 100,000 cps. If the viscosity is too low beyond this range, the coating processability deteriorates, and if the viscosity is too high, the drying property deteriorates, and the coating uniformity is lowered, which is not preferable.

Since the coating resin composition for a flexible cover window according to the present disclosure is for UV curing, it may include a monomer, a coupling agent, an additive, a photopolymerization initiator, etc., in addition to the urethane (meth)acrylate-based oligomer.

Specifically, the urethane (meth)acrylate-based oligomer may be 10 to 150 parts by weight. When the amount is less than 10 parts by weight, photocuring does not occur sufficiently. When the amount exceeds 150 parts by weight, the viscosity of the resin layer increases and the drying property deteriorates, and the coating uniformity is lowered, which is not preferable. Specifically, the urethane (meth)acrylate-based oligomer may be 30 to 100 parts by weight.

The first photocurable acrylate-based monomer may be used to adjust the viscosity, for example, may be one or a mixture of two or more selected from the group consisting of 2-hydroxyethyl acrylate (2-HEA), hydroxyethyl methacrylate (HEMA), hexanediol diacrylate (HDDA), hydroxypivalic acid neopentyl glycol diacrylate (HPNDA), and tripropylene glycol diacrylate (TPGDA).

The first photocurable acrylate-based monomer may be used in an amount of 1 to 60 parts by weight. The viscosity control effect cannot be expected if the first photocurable acrylate-based monomer exceeds the range and is less than 1 part by weight, and the viscosity may be excessively diluted if the first photocurable acrylate-based monomer exceeds 60 parts by weight, which is not preferable. Specifically, the urethane (meth)acrylate-based oligomer may be 5 to 50 parts by weight.

The second photocurable acrylate-based monomer may be one or a mixture of two or more selected from the group consisting of 1,6-hexanediol diacrylate (HDDMA), hydroxypivalic acid neopentyl glycol, diacrylate (HPNDA), trimethylolpropane triacrylate (TMPTA), pentaerythritol triacrylate, trimethylenepropane triacrylate, pentaerythrityl triacrylate, trimethylene propyl triacrylate, and propoxylated glycerol triacrylate.

0.5 to 10 parts by weight of the second photocurable acrylate-based monomer may be used. When the content is more than the above range and is less than 0.5 parts by weight, UV curing property may be insufficient to increase strength and viscosity, and when the content is more than 10 parts by weight, curing property may be problematic, and thus, cracks may occur, which is not preferable. Specifically, the second photocurable acrylate-based monomer may be 1 to 5 parts by weight.

According to the present disclosure, the alkoxy silane coupling agent may improve the dispersibility of the resin composition while preventing aggregation and improving surface leveling properties to prevent irregularities or wrinkles. The alkoxy silane coupling agent may use, for example, one or a mixture of two or more selected from the group consisting of vinyltrimethoxysilane, vinyltriethoxysilane, phenyltrimethoxysilane, octadecyltrimethoxysilane, 2-(3,4-epoxycyclohexyl)ethyltrimethoxysilane, 3-glycidyloxypropyltrimethoxysilane, 3-glycidyloxypropyltriethoxysilane, 3-glycidyloxypropylmethyldiethoxysilane, 3-methacryloxypropylmethyldimethoxysilane, 3-methacryloxypropylmethyldiethoxysilane, 3-methacryloxypropyltriethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-mercaptopropyltrimethoxysilane, and 3-mercaptopropyltriethoxysilane, but the present disclosure is not limited thereto. In particular, when 3-mercaptopropyltrimethoxysilane is used, adhesion to tempered glass may be excellent.

0.5 to 10 parts by weight of such an alkoxysilane coupling agent may be used. When too much or too little amount is used beyond the above range, the intended effect of the present disclosure cannot be exhibited, so which is not preferable. Specifically, the urethane (meth)acrylate-based oligomer may be 1 to 5 parts by weight.

The siloxane additive may be used to remove bubbles from the resin composition, remove aggregates on the surface, control viscosity, and act as a catalyst. The siloxane additive may use, for example, one or a mixture of two or more selected from the group consisting of polydimethylsiloxane, polyether-modified polydimethylsiloxane, and polyketylalkylsiloxane having 2 to 10 carbon atoms but is not limited thereto.

0.1 to 5 parts by weight of such siloxane additives may be used. When too much or too little amount is used beyond the above range, the intended effect of the present disclosure cannot be exhibited, so which is not preferable. Specifically, the urethane (meth)acrylate-based oligomer may be 0.1 to 1 parts by weight.

The photopolymerization initiator may cause a photopolymerization reaction by absorbing light when irradiated with light such as UV and generating radically active species by a photochemical reaction. The photopolymerization initiator may use any one or more of, for example, benzoin alkyl ethers, thioxanthones, ketals, acetophenones, anthraquinones, etc., but is not limited thereto.

1 to 20 parts by weight of such a photopolymerization initiator may be used. When too much or too little amount is used beyond the above range, brittleness is high, and ductility is low due to over-curing, which may cause a problem of being easily damaged by mechanical impact, or the problem of lowering the surface hardness by non-curing due to insufficient photocuring, which is not preferable. Specifically, the urethane (meth)acrylate-based oligomer may be 1 to 10 parts by weight.

On the other hand, the present disclosure provides a flexible cover window for a flexible display.

The present disclosure provides the flexible cover window in which a resin layer made of the coating resin composition for a flexible cover window is formed on one or both surfaces of the flexible cover window, the flexible cover window includes: a plane part 111 formed to correspond to the flat area of the flexible display; and a folding part formed to correspond to the folding area of the flexible display and connected to the plane part 111 and having a relatively thin thickness with respect to the plane part 111.

The resin layer may be filled in the folding part to form a single or multi-layered total surface of one or both surfaces of the flexible cover window.

After photo-curing the ether-based polyol may have low-hardness physical properties, and polyoxyalkylene-based bisphenol ether may have high-hardness physical properties. According to product specifications or uses, or the front or rear surface of the flexible cover window 100, or each layer in case of multi-layer coatings, the resin layer may be formed by adjusting the contents of the ether-based polyol and the polyoxyalkylene-based bisphenol ether.

As an embodiment, when the resin layer is formed on both sides of the flexible cover window, since the resin layer 130 formed on the front surface of the cover window 100 is touched, the polyoxyalkylene-based bisphenol ether with harder physical properties may be further used for strength reinforcement. In the resin layer 130 formed on the back surface of the cover window 100, ether-based polyols with lower hardness physical properties may be more used for elastic reinforcement so as to provide buffering between the cover window 100, and are appropriately adjusted according to the use environment and product specification.

As another embodiment, when the resin layer is formed in multiple layers on the front surface of the flexible cover window, the resin layer may be formed of a relatively harder material toward the upper side of the cover window 100. In this case, the polyoxyalkylene-based bisphenol ether having high hardness physical properties may be further used above the cover window 100, that is, toward the upper layer.

The resin layer 130 may be formed on one surface or both surfaces of the glass-based flexible cover window 100 by coating on the flexible cover window 100 with any one of slot die coating, bar coating, spraying, dipping, screen printing, and inkjet printing processes.

The resin layer 130 may be photocured by applying energy of 500 to 3000 mJ/cm2 after forming on the flexible cover window 100. Here, the degree of curing of the resin layer 130 may be adjusted according to the front or rear surface of the cover window 100, and in this case, the energy may be applied by adjusting the intensity or time. In addition, when the resin layer 130 is formed in multiple layers, the resin layer 130 close to the cover window 100 may be soft-cured by adjusting the energy strength or time and may be hard-cured toward the upper layer.

According to the present disclosure, the thickness of the resin layer 130 is formed to be 0.01 to 0.6 mm, thereby securing strength characteristics and folding characteristics. When the thickness of the resin layer 130 is less than 0.01 mm, it is difficult to sufficiently implement the strength characteristics and folding characteristics intended by the present disclosure, and when it exceeds 0.6 mm, there is a risk that visibility may be reduced or the coating may not be uniform, so which is not preferable.

FIGS. 1 to 4 show various embodiments of the present disclosure.

Figure 1:
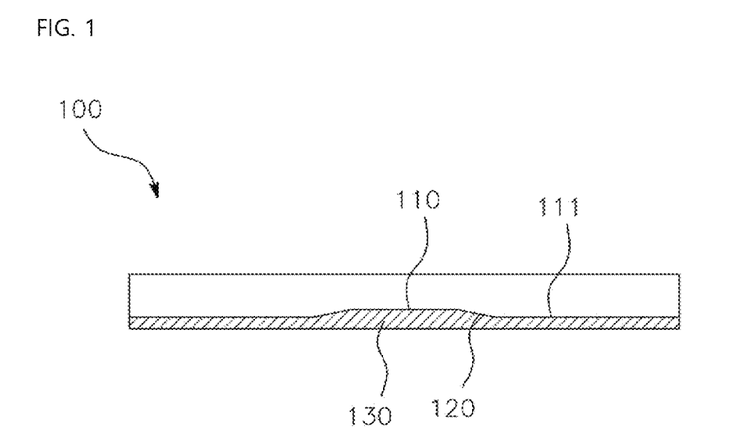
FIGS. 1 to 4 are views showing various embodiments of a flexible cover window according to the present disclosure.

FIG. 1 is a case in which the folding part 110 and the plane part 111 are formed on the back surface of the cover window 100, and the resin layer 130 is coated on the surface.

Figure 2:
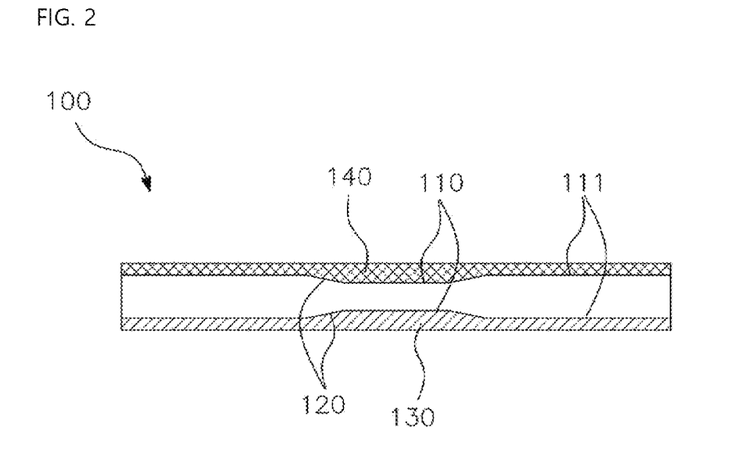

FIG. 2 is a case in which folding parts 110 and plane parts 111 are formed on both surfaces of the cover window 100, different materials (e.g., materials with different hardness) are coated on both surfaces, a resin layer 130 is formed on the back surface, and a resin layer 140 is formed on the front surface. In this case, the resin layer 140 on the front surface may have a higher hardness than the resin layer 130 on the back surface.

FIG. 3 illustrates a case in which a folding part 110 and a plane part 111 are formed on a back surface of the cover window 100, resin layers 130 are formed on both sides thereof, and resin layers 141 and 142 are formed in multiple layers on the front surface thereof. In this case, the resin layers 141 and 142 on the front side may have a higher hardness than the resin layer 130 on the backside. In addition, since the resin layer on the front side may have a higher hardness toward the upper side, the resin layer 142 may have a higher hardness than the resin layer 141.

FIG. 4 is a case in which folding parts 110 and plane parts 111 are formed on both surfaces of the cover window 100, resin layers 130 are formed on the back surface thereof, and resin layers 140, 141, and 142 are formed in multiple layers on the front surface thereof. In this case, the resin layers 140, 141, and 142 on the front side may have a higher hardness than the resin layer 130 on the backside. In addition, since the resin layer of the front surface may have a higher hardness toward the upper side, the hardness may increase from the resin layer 140 to the resin layer 142.

Although described with reference to the following examples, the following examples illustrate the present disclosure, and the scope of the present disclosure is not limited thereto.

Production Example 1

In a 2-liter round-bottom flask equipped with a stirrer, 137.89 g of isophorone diisocyanate (IPDI) diisocyanate and 0.50 g of a dibutyltindilaurate catalyst were added. After maintaining the reaction temperature at 80° C., 109.03 g of polyoxyethylene bisphenol A ether, a polyoxyalkylene-based bisphenol ether, was added to the reactor. After completion of the input, the NCO concentration of the reactant having a theoretical NCO concentration of 8.67% was adjusted to be between 7.5 and 8.5%. Then, 716.50 g of poly(tetramethylene ether)glycol (PTMG), an ether-based polyol, was added. After completion of the input, the NCO concentration of the reactant having a theoretical NCO concentration of 1.07% was adjusted between 0.7 and 1.0% to obtain a urethane prepolymer, 2.15 g of hydroquinone monomethyl ether (HQMME), 37.96 g (0.33 moles) of 2-hydroxyethyl acrylate (2-HEA) acrylic monomer was slowly added to proceed with the reaction. The reaction temperature was maintained at 80° C. for 1 hour after the injection was completed.

The completion of the reaction confirmed that the isocyanate reacted by confirming that the NCO peak of 2275 cm$^{-1}$ disappeared with infrared spectroscopy, and the number average molecular weight of the oligomer was 10,500 g/mol using gel permeation chromatography (GPC). A urethane (meth)acrylate oligomer having a viscosity of 60,000 cps was synthesized.

Production Example 2

In a 2-liter round-bottom flask equipped with a stirrer, 44.45 g of isophorone diisocyanate (IPDI) and 0.50 g of dibutyltindilaurate were added. After maintaining the reaction temperature at 80° C., 209.03 g of polyoxyethylene bisphenol ether was added to the reactor. After completion of the input, the NCO concentration of the reactant having a theoretical NCO concentration of 2.87% was adjusted to be between 2.5 and 2.7%. Then, 401.55 g of poly(tetramethylene ether)glycol (PTMG) was added. After maintaining the reaction temperature at 80° C., 73.47 g of methylidinetriphenylentriisocyanate (TTI) and 0.50 g of dibutyltindylate were added. After completion of the input, a urethane prepolymer was obtained by adjusting the NCO concentration of the reactant with a theoretical NCO concentration of 1.07% to 0.7 to 1.0%, and 2.15 g of hydroquinone monomethyl ether (HQMME) and 92.91 g of 2-hydroxyethyl acrylate (2-HEA) were slowly introduced to proceed with the reaction. The reaction temperature was maintained at 80° C. for 1 hour after the injection was completed.

The completion of the reaction was confirmed that the isocyanate reacted by confirming that the NCO peak of 2275 cm$^{-1}$ disappeared with infrared spectroscopy, and the number average molecular weight of the oligomer was 7,500 g/mol using gel permeation chromatography (GPC), and a urethane (meth)acrylate oligomer having a viscosity of 25,000 cps was synthesized.

Production Example 3

In a 1-liter round-bottom flask equipped with a stirrer, 137.89 g of isophorone diisocyanate (IPDI) and 0.50 g of dibutyltindilaurate were added. After maintaining the reaction temperature at 80° C., 109.03 g of polyoxyethylene bisphenol A ether was added to the reactor. After completion of the input, the NCO concentration of the reactant having a theoretical NCO concentration of 8.67% was adjusted to be between 7.5 and 8.5%. Then, 358.25 g of poly(tetramethylene ether)glycol (PTMG) was added. After completion of the input, the NCO concentration of the reactant having a theoretical NCO concentration of 1.07% was adjusted between 0.7 and 1.0% to obtain a urethane prepolymer, and 2.15 g of hydroquinone monomethyl ether (HQMME) and 98.44 g of pentaerythritol triacrylate were slowly added to proceed with the reaction. The reaction temperature was maintained at 80° C. for 2 hours after the injection was completed.

The completion of the reaction was confirmed that the isocyanate reacted by confirming that the NCO peak of 2275 cm-1 disappeared with infrared spectroscopy, and the number average molecular weight of the oligomer was 6,500 g/mol using gel permeation chromatography (GPC), and a urethane (meth)acrylate oligomer having a viscosity of 40,000 cps was synthesized.

Examples 1 to 9

A resin composition was prepared under the conditions of Table 1 using the urethane (meth)acrylate oligomers prepared in Preparation Examples 1 to 3 (unit is parts by weight).

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Oligomer | Production Example 1 | 50 | 65 | 80 | — | — | — | — | — | — |
| | Production Example 2 | — | — | — | 50 | 65 | 80 | — | — | — |
| | Production Example 3 | — | — | — | — | — | — | 50 | 65 | 80 |
| Monomer | 2-hydroxyethyl acrylate | 40 | 25 | 10 | 40 | 25 | 10 | 40 | 25 | 10 |
| | Pentaerythrityl thiacrylate | 3 | 3 | 3 | 3 | 3 | 3 | 3 | 3 | 3 |

TABLE 1-continued

| | | Example 1 | Example 2 | Example 3 | Example 4 | Example 5 | Example 6 | Example 7 | Example 8 | Example 9 |
|---|---|---|---|---|---|---|---|---|---|---|
| Additives | 3-mercaptopropyl thimethoxysilane | 3 | 3 | 3 | 3 | 3 | 3 | 3 | 3 | 3 |
| | polyether polydimethyl siloxane | 0.2 | 0.2 | 0.2 | 0.2 | 0.2 | 0.2 | 0.2 | 0.2 | 0.2 |
| Photointhator | 1-hydroxycyclo hexylphenylketone | 3.8 | 3.8 | 3.8 | 3.8 | 3.8 | 3.8 | 3.8 | 3.8 | 3.8 |

Experimental Example

Evaluation of Physical Properties of Photocurable Compositions

In order to examine the physical properties and folding performance of the coating compositions prepared in Examples 1 to 9, glass adhesion and transmittance, haze, refractive index after curing, static folding, 2.5% secant modulus, elongation, and 200,000 folding tests were confirmed as follows, and the results are shown in Tables 2 and 3 below.

Glass Adhesion

The prepared resin composition is applied on the tempered glass having a plane part thickness of 50 μm and a folding part depth of 10 μm, and then pushed to a thickness of 50 μm using a bar coater and placed in a fixing frame in which nitrogen is injected (nitrogen flow rate: 40 lpm). The sample was cured by light irradiation using a 600 W 9 mm metal lamp at a speed of 3.5 m/min and an amount of light of 2.0 J/cm$^2$ to prepare a sample having a thickness of 50 μm in the folding part. Cross-cut (1 mm interval, 10×10, 100 cell) was performed on the cured coating layer, and the adhesive strength with glass was measured by peeling it off after bonding with comet tape (0.3 Kgf).

In Table 2, when the adhesion between the cell of the cut coating layer and the tempered glass was 100%, it was denoted by O, and when the adhesion was less than 100%, it was denoted by X.

Transmittance and Haze

The prepared resin composition is applied on the tempered glass having a plane part thickness of 50 μm and a folding part depth of 10 μm, and then pushed to a thickness of 50 μm using a bar coater and placed in a fixing frame in which nitrogen is injected (nitrogen flow rate: 40 lpm). The sample was cured by light irradiation using a 600 W 9 mm metal lamp at a speed of 3.5 m/min and an amount of light of 2.0 J/cm$^2$ to prepare a sample having a thickness of 50 μm in the folding part. The prepared sample was measured according to ASTM D1003 standard using a haze gard of BYK.

Refractive Index after Curing

The prepared resin composition is applied on the PET film having a size of 240 mm×340 mm, and it is pushed with a bar coater and placed in a fixing frame in which nitrogen is injected (nitrogen flow rate: 40 lpm). The sample was cured by light irradiation using a 600 W 9 mm metal lamp at a speed of 3.5 m/min and an amount of light of 2.0 J/cm$^2$ to prepare a resin composition film sample having a thickness of 75 μm. The cured composition was cut into 20 mm×50 mm, and then the refractive index was measured using a DR-M2 Abbe refractometer (light source with a wavelength of 589 nm) manufactured by ATAGO.

Static Folding

The prepared resin composition is applied on the tempered glass having a plane part thickness of 50 μm and a folding part depth of 10 μm, and then pushed to a thickness of 50 μm using a bar coater and placed in a fixing frame in which nitrogen is injected (nitrogen flow rate: 40 lpm). The sample was cured by light irradiation using a 600 W 9 mm metal lamp at a speed of 3.5 m/min and an amount of light of 2.0 J/cm$^2$ to prepare a sample having a thickness of 50 μm in the folding part. The prepared sample was fixed with 3M 810 tape on an aluminum jig with a 3 mm diameter hinge, covered, folded, and stored at room temperature at 23° C. for 72 hours, and then evaluated.

In Table 2, if there are no fold marks or bends when visually confirmed through a 3-wavelength lamp on the folded part after the test is completed, it is denoted as 0, and when fold marks or bends are visually confirmed, it is denoted as X.

2.5% Secant Modulus and Elongation

The prepared resin composition is applied on the PET film having a size of 240 mm×340 mm, and it is pushed with a bar coater and placed in a fixing frame in which nitrogen is injected (nitrogen flow rate: 40 lpm). The sample was cured by light irradiation using a 600 W 9 mm metal lamp at a speed of 3.5 m/min and an amount of light of 2.0 J/cm$^2$ to prepare a resin composition film sample having a thickness of 75 μm. The prepared film was cut to a width of 13 mm using a CO$_2$ laser, stored in a desiccator with a relative humidity of less than 50% at 23° C. for one day, and pulled at a speed of 25 mm/min using AGS-X STDUTM from Shimazu to measure 2.5% secant modulus and reliability.

Folding Test 200,000 Times Under the Condition of Curvature Radius of 1.5R (Diameter 3 mm)

The prepared resin composition is applied on the tempered glass having a thickness of 50 μm in the plane part and a depth of 10 μm in the folding part, and then pushed to a thickness of 10 to 200 μm using a bar coater and placed in a fixing frame in which nitrogen is injected (nitrogen flow rate 40 lpm). The sample was cured by light irradiation using a 600 W 9 mm metal lamp at a speed of 3.5 m/min and an amount of light of 2.0 J/cm$^2$ to prepare a sample with a thickness of 10-200 μm in the folding part. The prepared sample was evaluated by folding 200,000 times at a speed of 30 times/min at 25° C. after bonding to the folding facility of Plexigo using 50 μm OCA (Optical Clear Adhesive) film.

In Table 3, if there is no peeling or breaking of tempered glass between the tempered glass and the coating after the test, it is denoted with O, and if peeling of the coating or breaking of tempered glass occurs, it is denoted with X.

TABLE 2

<Physical properties>

| | Example 1 | Example 2 | Example 3 | Example 4 | Example 5 | Example 6 | Example 7 | Example 8 | Example 9 |
|---|---|---|---|---|---|---|---|---|---|
| Glass Adhesion | ○ | ○ | ○ | X | X | X | X | X | X |
| Transmittance [%] | 92.41 | 92.20 | 92.09 | 92.33 | 92.29 | 92.27 | 92.16 | 92.02 | 91.89 |
| Haze [%] | 0.07 | 0.08 | 0.08 | 0.08 | 0.08 | 0.08 | 0.05 | 0.05 | 0.05 |
| Refractive Index after Curing (Glass: 1.5050) | 1.5019 | 1.5028 | 1.5031 | 1.5009 | 1.5011 | 1.5012 | 1.4980 | 1.4995 | 1.5001 |
| Static Folding (1.5 R) | X | ○ | ○ | ○ | ○ | ○ | ○ | ○ | ○ |
| 2.5% Secant Modulus [Mpa] | 9 | 18 | 25 | 599 | 677 | 712 | 1616 | 1915 | 2129 |
| Elongation [%] | 102 | 91 | 87 | 32 | 22 | 16 | 10 | 8 | 4 |

TABLE 3

<200,000 times of folding test under the condition of radius of curvature 1.5 R (diameter 3 mm)>

| | Example 1 | Example 2 | Example 3 | Example 4 | Example 5 | Example 6 | Example 7 | Example 8 | Example 9 |
|---|---|---|---|---|---|---|---|---|---|
| 10 μm Coating | ○ | ○ | ○ | ○ | ○ | ○ | ○ | ○ | ○ |
| 30 μm Coating | ○ | ○ | ○ | ○ | ○ | ○ | Δ | Δ | Δ |
| 50 μm Coating | ○ | ○ | ○ | Δ | Δ | Δ | ΔΔ | X | X |
| 90 μm Coating | ○ | ○ | ΔΔ | X | X | X | XX | XX | XX |
| 200 μm Coating | ○ | ○ | ΔΔ | X | X | X | XX | XX | XX |

(○: pass, Δ: warpage, ΔΔ: edge peeling, X: peeling, XX: broken glass)

It may be seen that the present disclosure shows a refractive index very close to the tempered glass while using a transparent resin layer to solve the visibility problem of the bending phenomenon of the folding part.

According to Tables 2 and 3, in all Examples, the light transmittance is 90% or more, and a resin layer having a haze of 0.1 or less may be provided. In addition, the glass substrate and the resin layer have the same level of Reflective Index, and a high transparency resin layer may be provided. When the folding part is implemented, visual visibility at the boundary part of the folding part may be minimized, and thus, a transparent resin layer is used to solve a problem of visibility for the bending phenomenon of the folding part, thereby showing a refractive index very close to tempered glass. In particular, in Examples 2 and 3, it may be confirmed that a resin layer having excellent adhesion without separation of cells is provided.

In addition, in the case of 10 micrometer coating in all Examples, when folding was performed 200,000 times with a radius of curvature of 1.5R, there were no peeling or folding marks, no bending of the resin layer. When the sample is folded with 1.5R for 72 hours or more, it is possible to provide a resin layer with no fold traces or flexures at the folding part.

In addition, it was confirmed once again that the limit folding (folding threshold point) in which the resin layer is damaged, or the glass is damaged satisfies the 0.5r level, thereby exhibiting very excellent folding characteristics.

Check Radius of Curvature with Limit Folding Test

After the coating composition prepared in Examples 1 to 9 was coated twice to a thickness of 10 μm using a slot die coater on tempered glass having a plane part thickness of 30 μm, placed in a fixing frame in which nitrogen was injected (nitrogen flow rate of 401 pm). The sample was cured by light irradiation using a 600 W 9 mm metal lamp at a speed of 3.5 m/min and an amount of light of 2.0 J/cm$^2$ to prepare a sample with a thickness of 20 μm. After folding the prepared sample using DIB's folding equipment, when the glass is broken, the radius of the critical point was checked and evaluated and shown in Table 4, and a photograph measuring the folding characteristics of the flexible cover window according to Example 2 is shown in FIG. 5.

TABLE 4

<Radius in limit folding test [mm]>

| | Example 1 | Example 2 | Example 3 | Example 4 | Example 5 | Example 6 | Example 7 | Example 8 | Example 9 |
|---|---|---|---|---|---|---|---|---|---|
| 20 μm Coating | 0.455 | 0.43 | 0.41 | 0.56 | 0.55 | 0.67 | 0.74 | 0.78 | 1.00 |

In Table 4, the smaller the radius in the limit folding test, the better the performance. In particular, FIG. 5 shows a photograph of measuring the folding characteristics of the flexible cover window according to Example 2, and it was confirmed that there was no folding trace or bending of the resin layer at a radius of curvature of 1.5R (diameter 3 mm). In addition, it was confirmed once again that the limit folding (folding critical point) in which the resin layer is damaged, or the glass is damaged satisfies the 0.5r level, thereby exhibiting very excellent folding characteristics. In addition, according to the increase in the coating thickness by the number of coatings, the disadvantages of the conventional foldable CPI on engraving strength and the breaking of the glass may be supplemented, and a resin layer exhibiting the effect of preventing scattering of the glass may be provided.

Checking the Coating Thickness and Smoothness in the Process Using a Slot Die Coater The resin composition prepared in Example 2 was applied several times using a slot die coater (DCN) at a flow rate of 0.5 ml/sec and a line speed of 100 mm/min on a tempered glass having a plane part thickness of 50 μm and a folding part depth of 10 μm and then put into a fixing frame into which nitrogen is injected (nitrogen flow rate 401 pm). The sample was cured by light irradiation using a 600 W 9 mm metal lamp at a speed of 3.5 m/min and an amount of light of 2.0 J/cm² to prepare a sample with a thickness of 10-50 μm in the folding part. The thickness of the prepared sample was measured using a micrometer (Mitsutoyo Co., Ltd.) with respect to the plane part and the folding part, and the smoothness was visually confirmed and shown in Table 5.

TABLE 5

<Coating thickness and smoothness [μm]>

| | Plane Part | Folding Part | Smoothness |
|---|---|---|---|
| Coating Once | 60 | 52 | X |
| Coating Twice | 70 | 65 | Δ |
| Coating three times | 80 | 77 | ○ |
| Coating Four times | 90 | 89 | ● |

(●: Very good, ○: Good, Δ: Shows wavy phenomenon, X: Severe wave phenomenon)

According to Table 5, it was confirmed that when the slot die coater is performed two to four times, that is, at least two times or more, the surface smoothness (wave phenomenon) is excellent, and thus the process is very suitable for a cover window for display.

What is claimed is:

1. A flexible cover window having a resin layer made of a coating resin composition and formed on one or both surfaces thereof,
    the coating resin composition comprising:
        10 to 150 parts by weight of a urethane (meth) acrylate-based oligomer prepared by synthesizing an acrylic monomer comprising a hydroxyl group with a urethane prepolymer synthesized from an ether-based polyol, diisocyanate, and polyoxyalkylene-based bisphenol ether;
        1 to 60 parts by weight of a first photocurable acrylate-based monomer;
        0.5 to 10 parts by weight of a second photocurable acrylate-based monomer;
        0.5 to 10 parts by weight of an alkoxy silane coupling agent;
        0.1 to 5 parts by weight of a siloxane additive; and
        1 to 20 parts by weight of a photopolymerization initiator; and
    the flexible cover window comprising:
        a plane part formed to correspond to a flat area of the flexible display; and
        a folding part formed to correspond to a folding area of the flexible display, connected to the plane part, and being thinner than the plane part.

2. The flexible cover window of claim 1, wherein the resin layer is filled in the folding part and is formed in a single layer or multi-layer on the entire surface on one side or both sides of the flexible cover window.

3. The flexible cover window of claim 2, wherein when the resin layer is formed on both surfaces of the flexible cover window, a resin layer positioned on the front side of the flexible cover window is formed of a harder material than a resin layer positioned on the rear side of the flexible cover window.

4. The flexible cover window of claim 2, wherein when the resin layer is formed in multiple layers on the front side of the flexible cover window, the hardness of the resin layer increases toward the upper end thereof.

5. The flexible cover window of claim 1, wherein the resin layer has a thickness of 0.01 to 0.6 mm.

6. The flexible cover window of claim 1, wherein the urethane (meth) acrylate-based oligomer is prepared by synthesizing 1 to 30 parts by weight of an acrylic monomer containing a hydroxyl group with a urethane prepolymer synthesized from 20 to 100 parts by weight of an ether-based polyol, 1 to 25 parts by weight of diisocyanate, and 1 to 50 parts by weight of polyoxyalkylene-based bisphenol ether.

7. The flexible cover window of claim 1, wherein the polyoxyalkylene-based bisphenol ether is one or a mixture of two or more selected from the group consisting of polyoxyethylene bisphenol F ether, polyoxyethylene bisphenol A ether, and polyoxypropylene bisphenol A ether.

8. The flexible cover window of claim 1, wherein the urethane (meth) acrylate-based oligomer is prepared by synthesizing an acryl-based monomer (M) containing a hydroxyl group with a urethane prepolymer synthesized from ether-based polyol (R2), diisocyanate (I), and polyoxyalkylene-based bisphenol ether (R1), and
    the urethane (metha) acrylate-based oligomer has a general structure of M-I-R2-I-R2-R1-I-R2-I-R2-I-M (wherein R1, R2, I and M each refer to a moiety derived from a corresponding compound).

9. The flexible cover window of claim 1, wherein the first photocurable acrylate-based monomer is one or a mixture of two or more selected from the group consisting of 2-hydroxyethyl acrylate (2-HEA), hydroxyethyl methacrylate (HEMA), hexanedioldiacrylate (HDDA), hydroxyvalic acid neopentyl glycol diacrylate (HPNDA), and tripropylene glycol diacrylate (TPGDA), and
    the second photocurable acrylate-based monomer is one or a mixture of two or more selected from the group consisting of 1,6-hexanediol diacrylate (HDDMA), hydroxypivalic acid neopentyl glycol diacrylate (HPNDA), trimethylolpropane triacrylate (TMPTA), pentaerythritol triacrylate, trimethylenepropane triacrylate, pentaerythrityl triacrylate, trimethylene propyl triacrylate, and propoxylated glycerol triacrylate.

10. The flexible cover window of claim 1, wherein the alkoxy silane coupling agent is one or a mixture of two or more selected from the group consisting of vinyltrimethoxysilane, vinyltriethoxysilane, phenyltrimethoxysilane, octadecyltrimethoxysilane, 2-(3,4-epoxycyclohexyl) ethyltrimethoxysilane, 3-glycidyloxypropyltrimethoxysilane, 3-glycidyloxypropyltriethoxysilane, 3-glycidyloxypropylmethyldiethoxysilane, 3-methacryloxypropylmethyldimethoxysilane, 3-methacryloxypropylmethyldiethoxysilane, 3-methacryloxypropyltTriethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-mercaptopropyltrimethoxysilane, and 3-mercaptopropyltriethoxysilane.

11. The flexible cover window of claim 1, wherein the siloxane additive is one or a mixture of two or more selected from the group consisting of polydimethylsiloxane, polyether-modified polydimethylsiloxane, and polyketylalkylsiloxane having 2 to 10 carbon atoms.

12. The flexible cover window of claim 1, wherein the alkoxy silane coupling agent comprises one or both of 3-mercaptopropyltrimethoxysilane or 3-mercaptopropyltriethoxysilane.

* * * * *